(12) United States Patent
Lanini et al.

(10) Patent No.: US 10,604,076 B2
(45) Date of Patent: Mar. 31, 2020

(54) RUNNING BOARD FOR VEHICLES

(71) Applicant: Westin Automotive Products, Inc., San Dimas, CA (US)

(72) Inventors: Jeremy Lanini, Alta Loma, CA (US); Paul Zavala, Glendora, CA (US); Jose Eduardo Lopez Moctezuma, Imperial, CA (US)

(73) Assignee: Westin Automotive Products, Inc., San Dimas, CA (US)

( * ) Notice: Subject to any disclaimer, the term of this patent is extended or adjusted under 35 U.S.C. 154(b) by 51 days.

(21) Appl. No.: 15/879,967

(22) Filed: Jan. 25, 2018

(65) Prior Publication Data
US 2019/0225157 A1    Jul. 25, 2019

(51) Int. Cl.
*B60R 3/00* (2006.01)

(52) U.S. Cl.
CPC .................. *B60R 3/002* (2013.01)

(58) Field of Classification Search
CPC .. B60R 3/00; B60R 3/002; B60R 3/02; B60R 3/007
See application file for complete search history.

(56) References Cited

U.S. PATENT DOCUMENTS

| | | | | |
|---|---|---|---|---|
| 4,935,638 A * | 6/1990 | Straka | ................ | B60R 3/00 280/163 |
| 4,943,085 A * | 7/1990 | Straka | ................ | B60R 3/00 182/92 |
| 6,135,472 A * | 10/2000 | Wilson | ................ | B60R 3/002 280/164.1 |
| D436,336 S | 1/2001 | Sadr | | |
| 6,382,819 B1 * | 5/2002 | McQuiston | ............ | B60Q 1/323 362/487 |
| D473,178 S | 4/2003 | Schumacher | | |
| 6,726,230 B2 * | 4/2004 | Weir | .................. | B60R 3/002 280/163 |
| 7,086,656 B2 * | 8/2006 | Kolpasky | ............ | B60R 3/002 280/164.1 |
| D535,928 S | 1/2007 | Crandall | | |
| 7,287,770 B2 | 10/2007 | Drabant | | |
| 7,360,779 B2 * | 4/2008 | Crandall | ............ | B60R 3/002 248/217.3 |

(Continued)

OTHER PUBLICATIONS

Copending U.S. Appl. No. 29/634,891, filed Jan. 25, 2018.

*Primary Examiner* — Emma K Frick
(74) *Attorney, Agent, or Firm* — The Dobrusin Law Firm, PC

(57) ABSTRACT

A modular running board system for attachment to a vehicle comprising a first running board member and a second running board member each having an exterior end and an interior end portion; a member connector, a structural frame bracket, and at least one seam covering step pad, wherein: (a) the interior end portions each accepts and attaches to a portion of the member connector forming a running board structural assembly having a connection seam (b) the at least one seam covering step pad attaches to the running board structural assembly and hides the connection seam from exterior view forming a seamless finished appearance; and (c) the structural frame bracket includes (i) a connection portion for attachment to the running board structural assembly, and (ii) a structural frame portion for attachment to structural frame of the vehicle.

19 Claims, 12 Drawing Sheets

(56) References Cited

U.S. PATENT DOCUMENTS

| | | | |
|---|---|---|---|
| 7,461,852 B2 * | 12/2008 | Richardson | B60R 3/00 280/163 |
| D588,514 S | 3/2009 | Kudelko | |
| D632,627 S | 2/2011 | Huang-Tsai | |
| 8,002,299 B2 * | 8/2011 | Huang-Tsai | B60R 3/00 280/163 |
| D676,368 S | 2/2013 | Cover | |
| 8,382,132 B2 * | 2/2013 | Kowalski | B60R 3/002 280/163 |
| 8,403,348 B1 * | 3/2013 | Wang | B60R 3/002 280/163 |
| 8,448,968 B1 * | 5/2013 | Grote | B60R 3/002 280/163 |
| 8,596,662 B2 * | 12/2013 | Huang-Tsai | G05G 1/483 280/163 |
| 8,657,318 B2 * | 2/2014 | Chen | B60R 3/002 280/163 |
| 8,864,158 B1 * | 10/2014 | Perkins | B60R 3/002 280/163 |
| D738,803 S | 9/2015 | Zhu | |
| 9,409,520 B1 * | 8/2016 | Wang | F16B 5/126 |
| 9,598,004 B2 * | 3/2017 | Yang | B60Q 1/323 |
| D794,525 S | 8/2017 | Chen | |
| D807,804 S | 1/2018 | Huang | |
| D817,838 S | 5/2018 | Dionisopoulos | |
| D818,923 S | 5/2018 | Baeza | |
| D818,924 S | 5/2018 | Baeza | |
| 2003/0178805 A1 * | 9/2003 | Elrod | B60R 3/002 280/163 |
| 2005/0012294 A1 * | 1/2005 | Yang | B60R 3/002 280/163 |
| 2005/0067741 A1 | 3/2005 | Chapman | |
| 2005/0087950 A1 * | 4/2005 | Draper | B60R 3/002 280/163 |
| 2012/0104718 A1 * | 5/2012 | Alvarez | B60R 3/00 280/163 |
| 2019/0202362 A1 * | 7/2019 | Yang | B60R 3/002 |

\* cited by examiner

RUNNING BOARD FOR VEHICLES

FIELD OF INVENTION

The present invention relates to vehicle accessory field. More specifically, it relates to running boards for vehicles.

BACKGROUND OF INVENTION

Running boards are popular accessories for vehicles, especially trucks, vans, and sport utility vehicles "SUVs". Each running board is usually attached to one side (e.g., passenger or driver side) of a vehicle's structural frame giving its passengers a surefooted boost into the vehicle, which is especially helpful to those passengers who may need that extra step to get in and out of the vehicle (e.g., small children, elderly people, or the like).

In order to provide a seamless finished appearance, a conventional running board is designed and shipped as a single structure and may extend the entire length between the front and the back wheels of a vehicle. This extended length significantly increases shipping costs and makes product storage more challenging.

SUMMARY OF THE INVENTION

The present invention addresses the above-discussed limitations by providing a running board that is modular in nature. The smaller modular components of the running board can be stored and shipped in a much more compacted fashion, thereby reducing costs. Once these modular components of the running board are fully assembled and attached to a vehicle, the running board provides the seamless finished appearance desired by customers.

BRIEF DESCRIPTION OF THE DRAWING

The features and inventive aspects of the present invention will become more apparent upon reading the following detailed description, claims, and drawings, of which the following is a brief description:

DESCRIPTION OF THE PREFERRED EMBODIMENT

Figure 1:
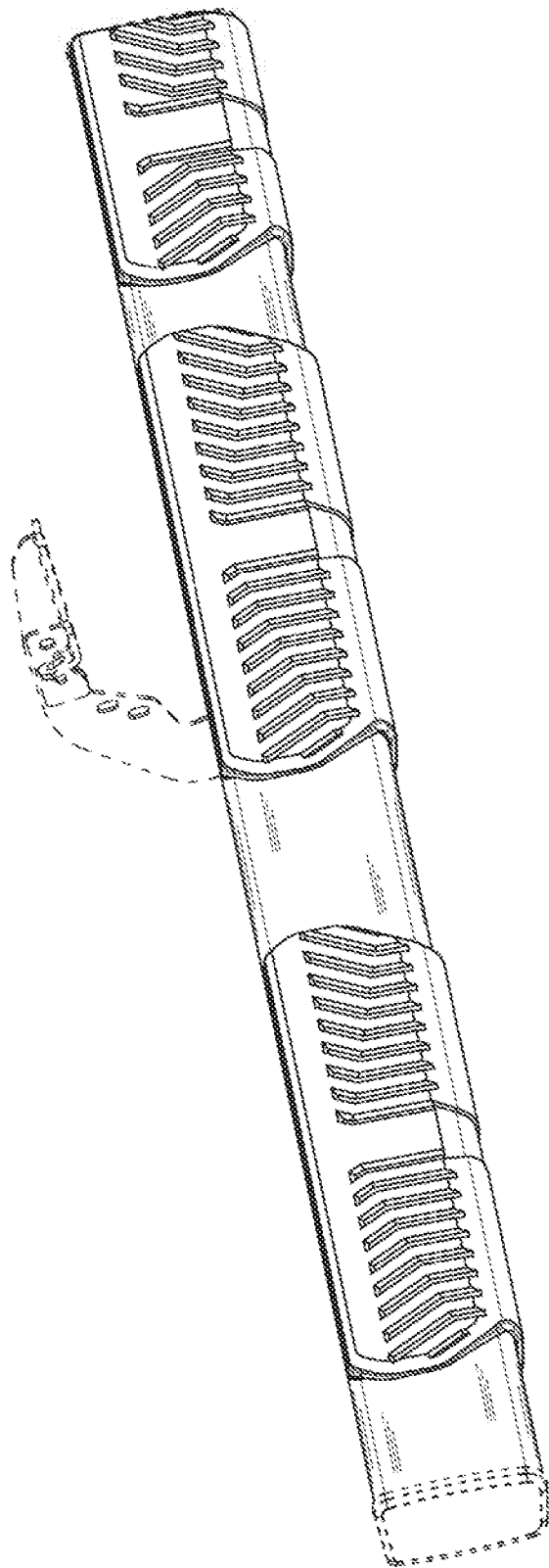
FIG. 1 is a top perspective view of one exemplary embodiment running board, in accordance to the principles of the present invention in its fully assembled fashion.
Figure 2:
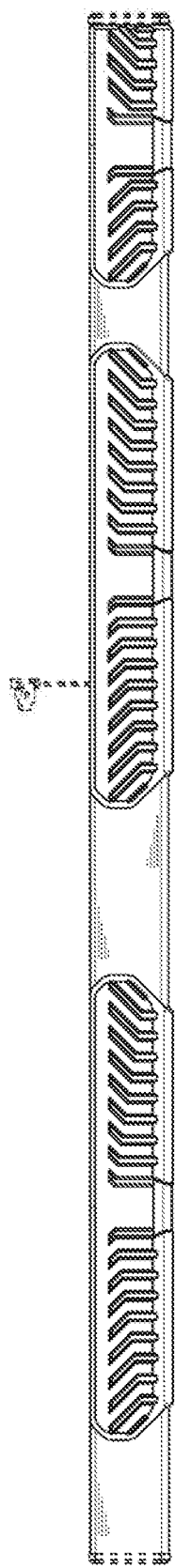
FIG. 2 is a bottom view of the running board shown in FIG. 1.
Figure 6:
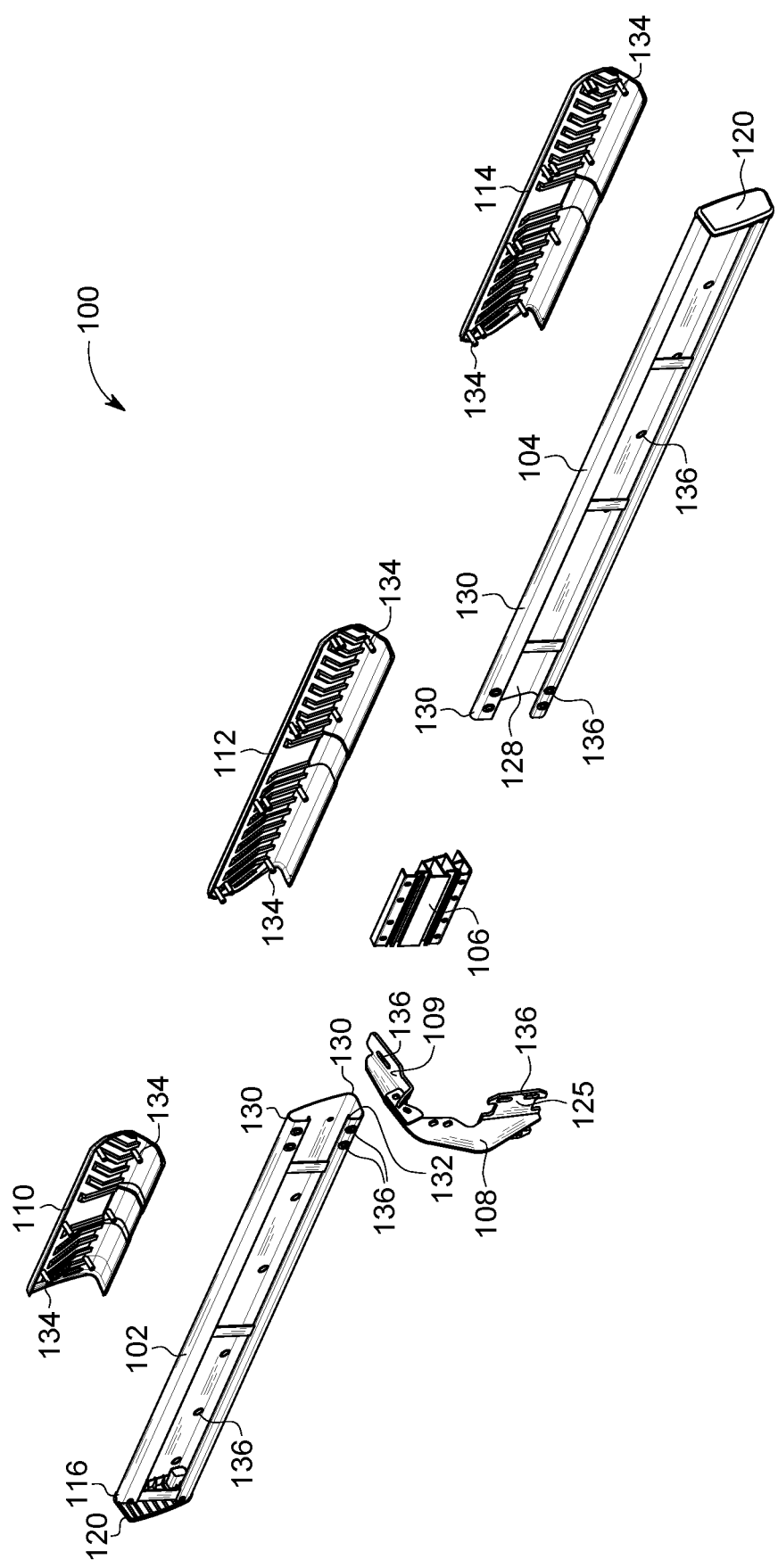
FIG. 6 is an exploded bottom perspective view of the running board shown in FIG. 1.
Figure 7:
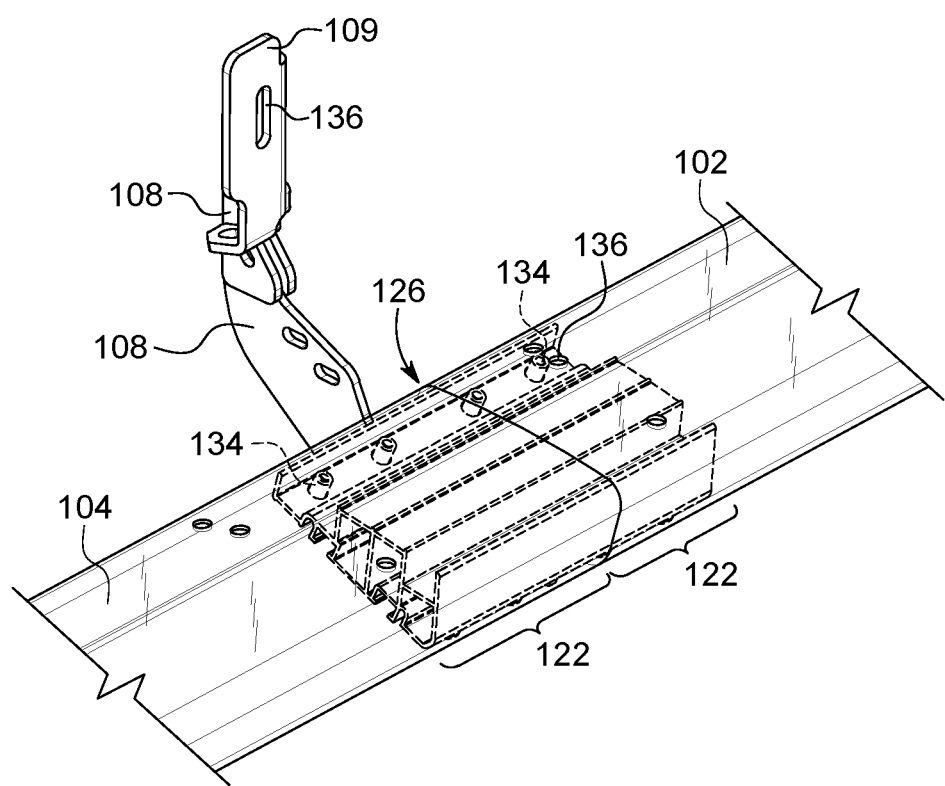
FIG. 7 is top perspective view of the components shown in FIG. 5.

Referring to FIGS. 1-8 showing an exemplary embodiment of a running board 100 of the present invention comprising a first running board member 102, a second running board member 104, a member connector 106, a structural frame bracket 108, and at least one seam covering step pad 112. At least one non-seam covering step pad (110, 114) is optionally included and in this embodiment, two non-seam covering step pads 110, 114 have been provided. Each of the running board members (102, 104) has an exterior end 116 and an interior end 118. The exterior end 116 includes an end cap 120. The end cap 120 can be constructed as a continuous part of the running board member (102 or 104) or a separate modular component that can be physically attached to the exterior end 116. The interior end 118 and a portion of the running board (102 or 104) adjacent to the interior end 118, collectively hereinafter referred to as the interior end portion 122 is designed to accept and be attached to a portion of the member connector 106 as shown in FIG. 7. Once the member connector 106 is attached to both the interior end portions 122 of the first running board member 102 and the second running board member 104, the running board structural assembly 124 is now formed having a connection seam 126 shown where the interior portions 122 are joined. Upon fully assembly of the running board 100, this connection seam 126 is hidden from sight by the at least one seam covering step pad 112 forming a seamless finished appearance as shown in FIG. 1.

Alternatively, the interior end portion 122 of one of the two running board members (e.g., 102) further includes the member connector 106 allowing the member connector 106 to become an integrated part of the interior end portion 122—this integrated structure shall hereinafter be referred to as "the interior end member connector portion". It should be noted that in this scenario, the interior end portion 122 of the remaining running board member (e.g., 104) would not include the member connector 106, but is instead similar to the above-described interior end portion 122 designed to accept and be attached to the member connector 106 of the interior end member connection portion. Once the interior end portion 122 of the second running board 104 is attached to the member connector 106 of the interior end member connector portion of the first running board member 102, the running board structural assembly 124 is now formed having a connection seam 126 shown where the interior portions 122 are joined. Upon fully assembly of the running board 100, this connection seam 126 is hidden from sight by the at least one seam covering step pad 112 forming a seamless finished appearance as shown in FIG. 1.

It should be noted that it is possible that the second running board 104 includes the interior end member connector portion instead of the first running board 102; and once the interior end portion 122 of the first running board 102 is attached to the member connector 106 of the interior end member connector portion of the second running board member 104, the running board structural assembly 124 is now formed having a connection seam 126 shown where the interior portions 122 are joined. Upon fully assembly of the running board 100, this connection seam 126 is hidden from sight by the at least one seam covering step pad 112 forming a seamless finished appearance as shown in FIG. 1. Upon fully assembly of the running board 100, this connection seam 126 is hidden from sight by the at least one seam covering step pad 112 forming a seamless finished appearance as shown in FIG. 1.

Figure 3:
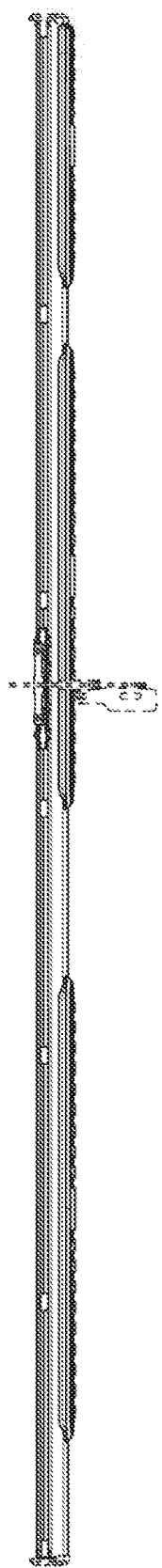
FIG. 3 is an exploded top perspective view of the running board shown in FIG. 1.
Figure 4:
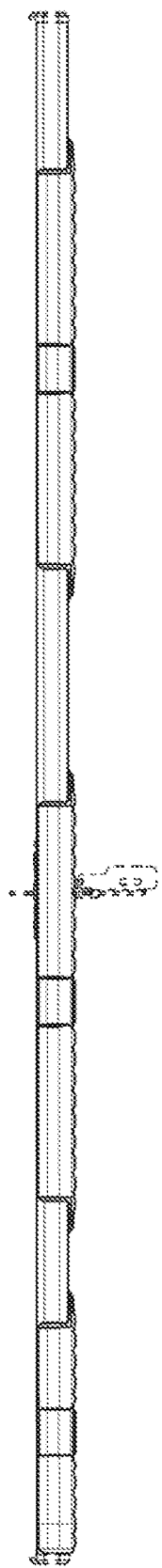
FIG. 4 is same exploded view of the running board as shown in FIG. 3 except that the running board structural assembly is assembled.
Figure 5:
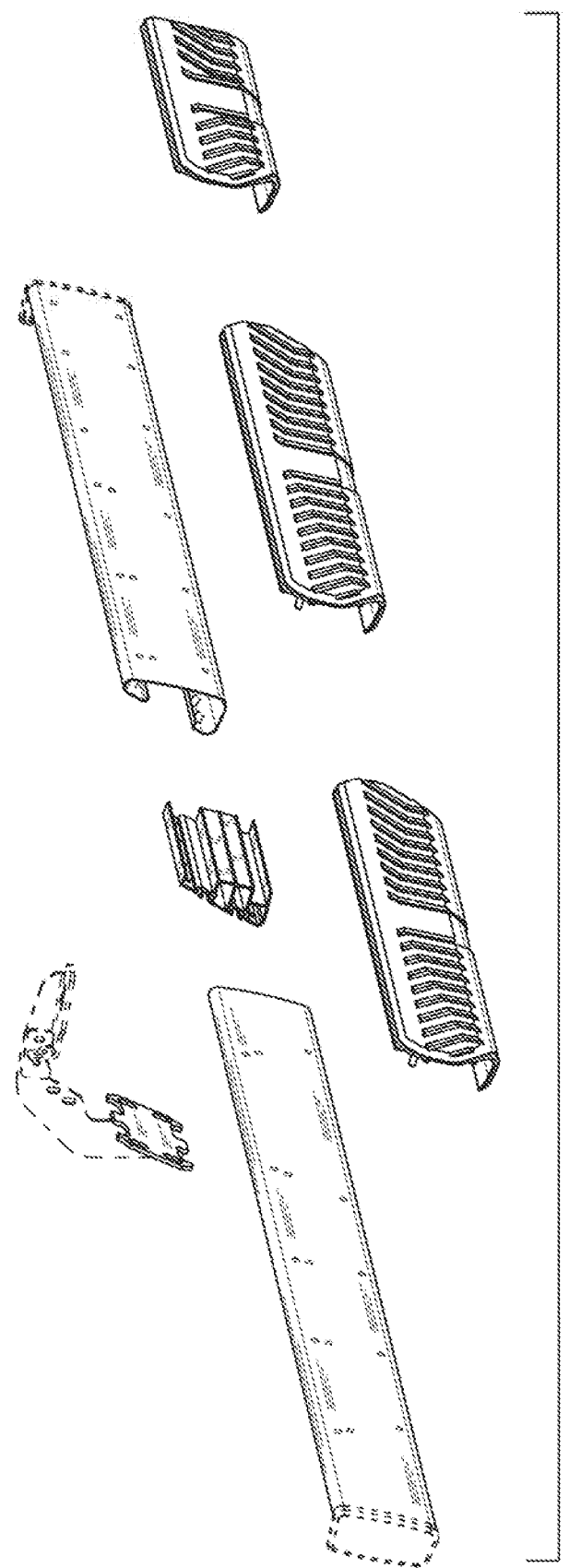
FIG. 5 is a bottom view of a section of the running board structural assembly as shown in FIG. 4 attached to a structural frame bracket.
Figure 8:
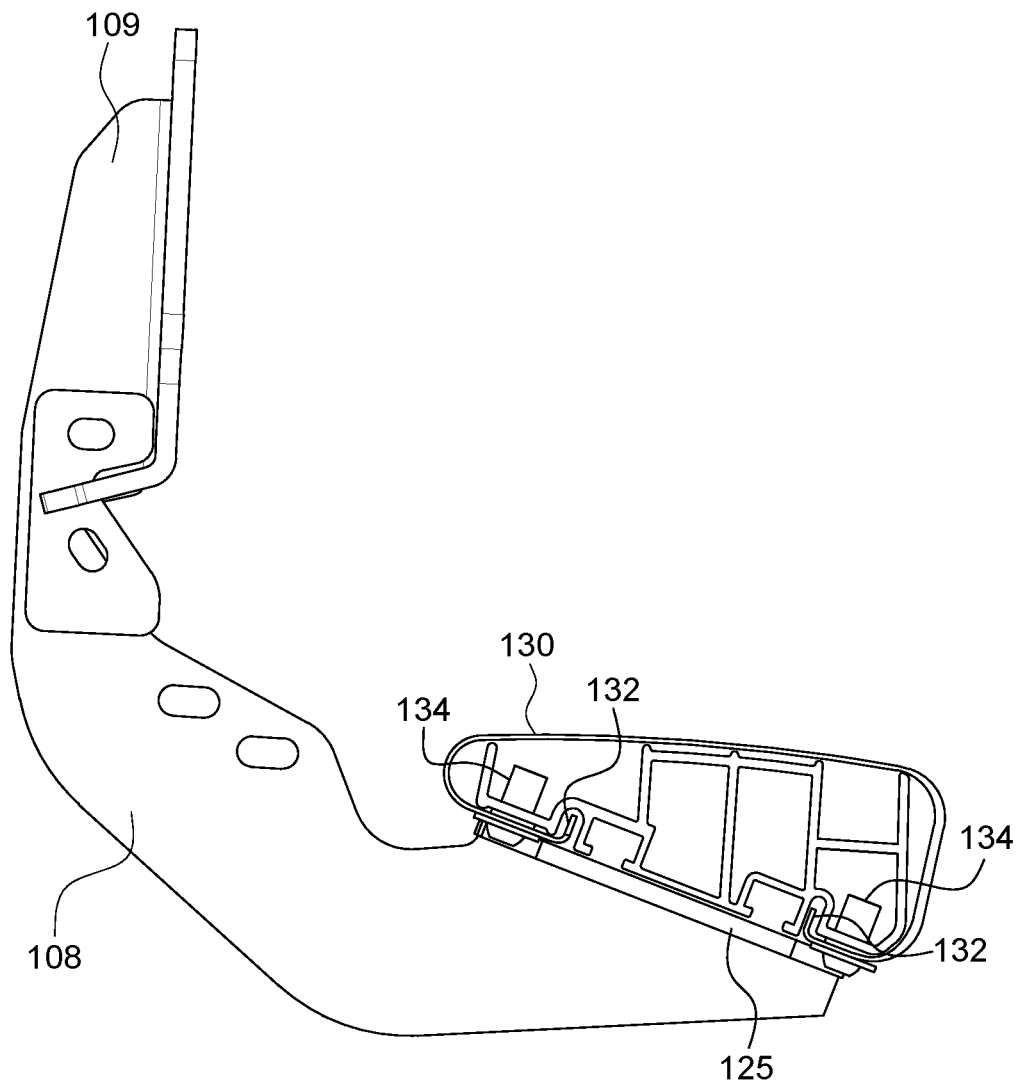
FIG. 8 is a cross sectional view of the components shown in FIG. 7.
Figure 9:
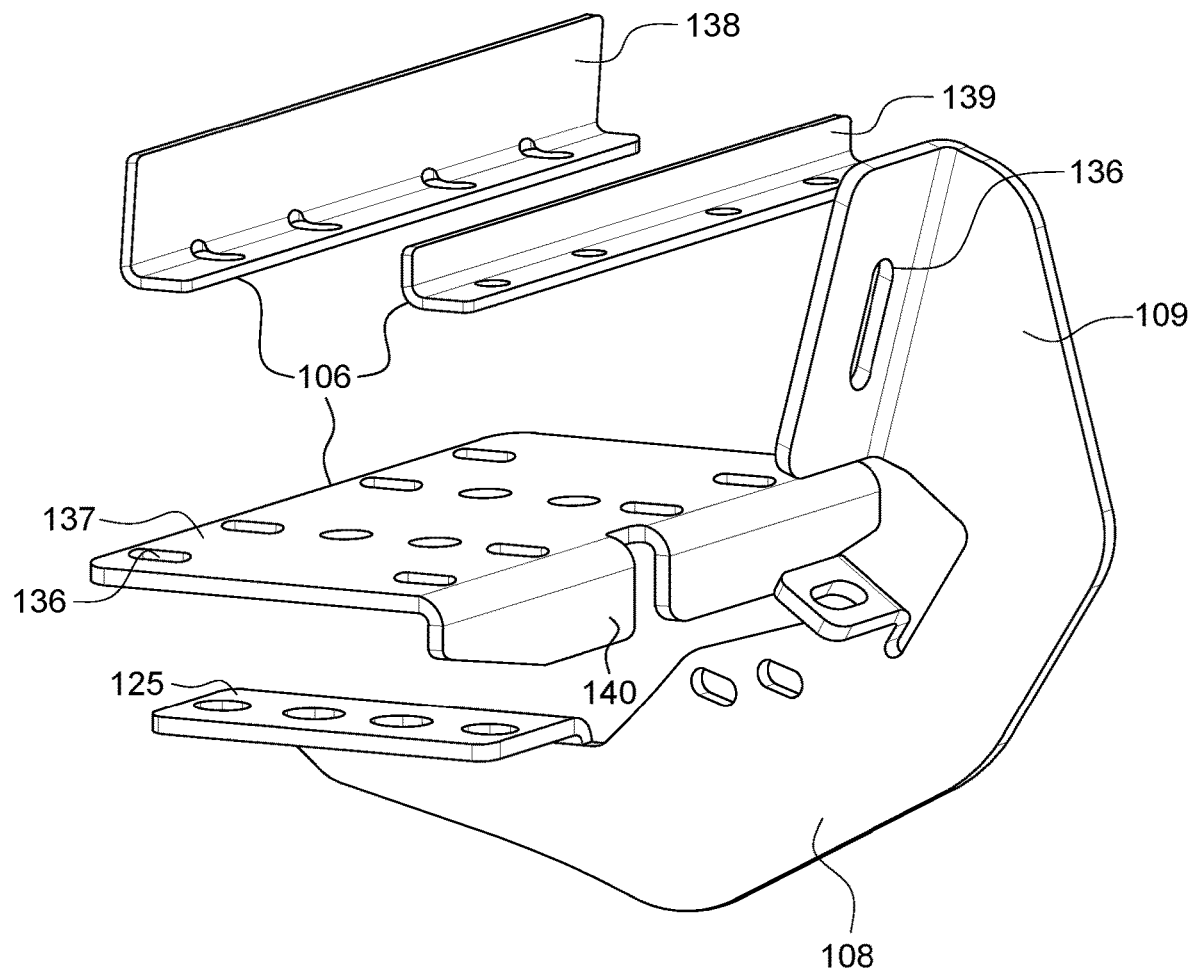
FIG. 9 is a rear perspective view of another embodiment of the member connector and the structural frame bracket.
Figure 10:
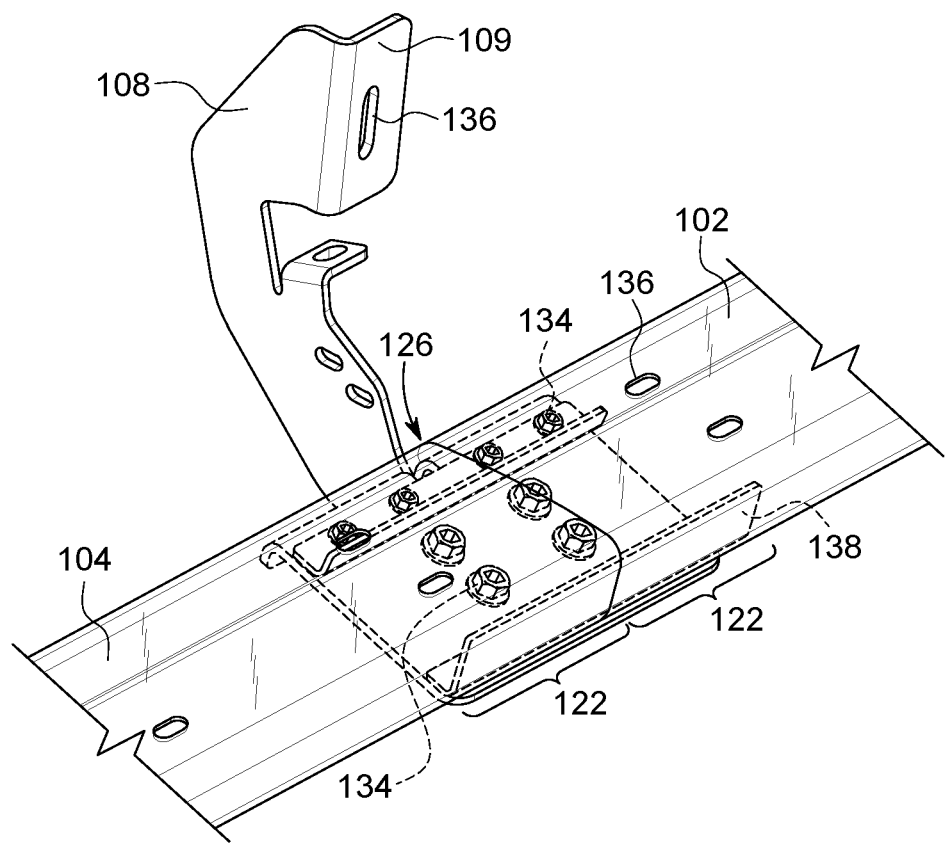
FIG. 10 is top perspective view of a section of the running board structural assembly attached to the member connector and the structural frame bracket shown in FIG. 9.
Figure 11:
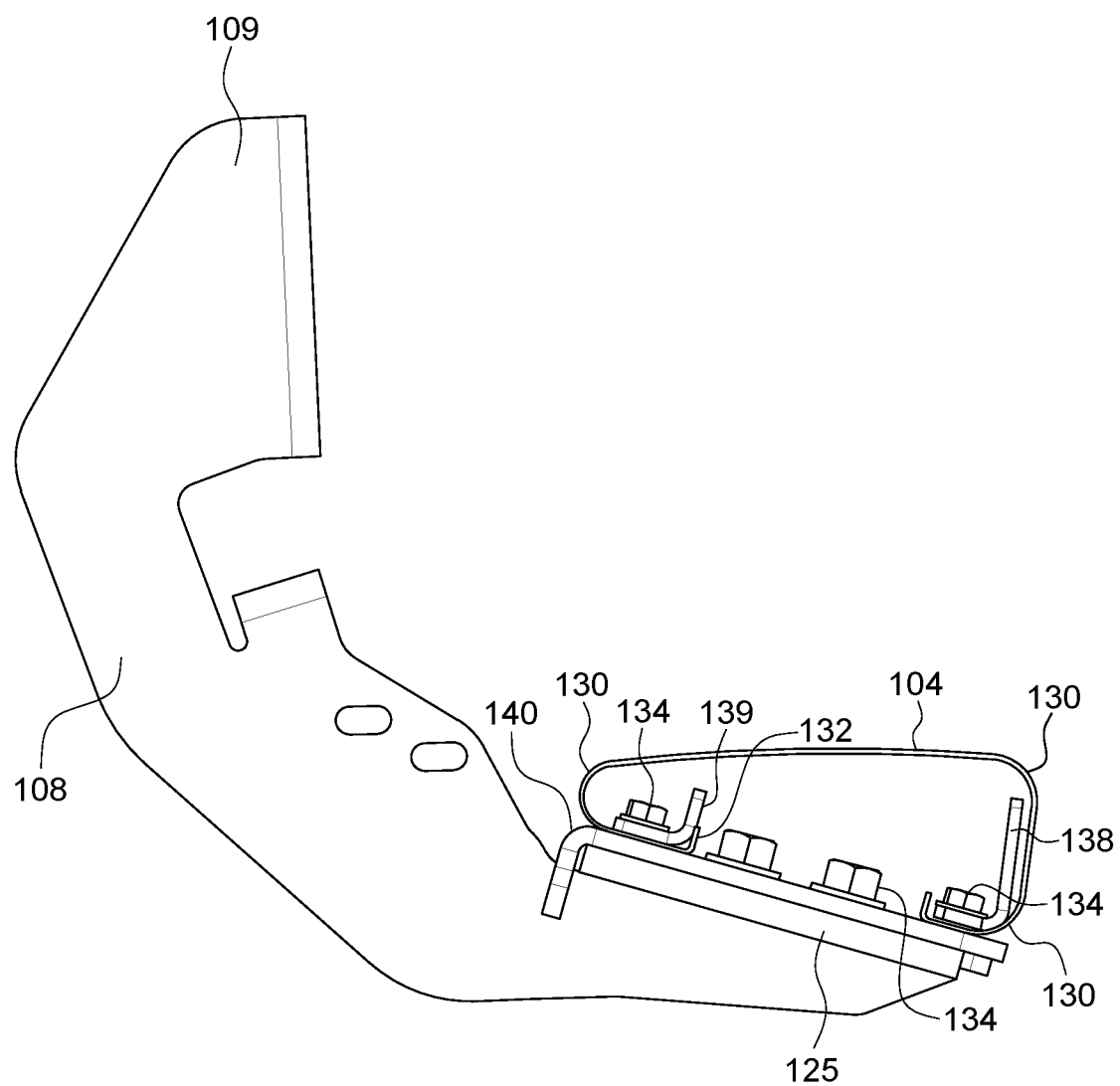
FIG. 11 is a cross sectional view of the components shown in FIG. 10.
Figure 12:
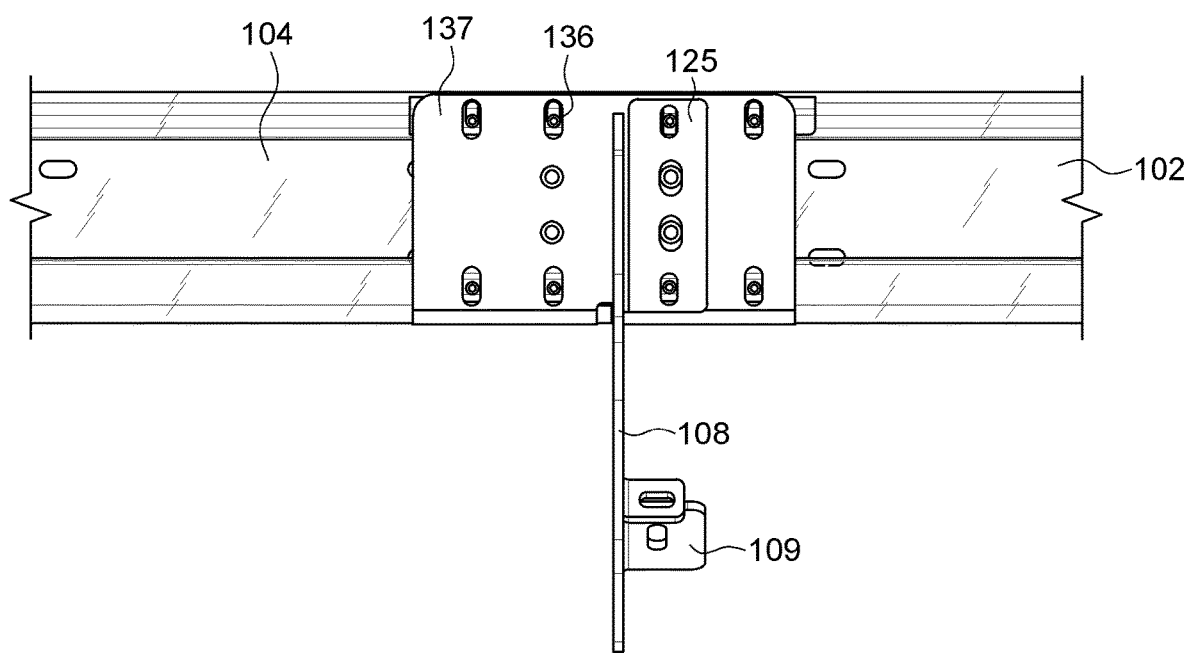
FIG. 12 is a bottom view of the components shown in FIG. 11.

The structural frame bracket 108 is used to attach the running board structural assembly 124 to the vehicle's structural frame (not shown). The structural frame bracket 108 includes a structural frame portion 109 having apertures 136 (e.g., drill holes or the like) for attachment to the vehicle's structural frame (not shown) via conventional fasteners such as nuts and bolts. The structural frame bracket 108 further includes a connection portion 125 having apertures (e.g., drill holes or the like) 136 for attachment to the running board structural assembly 124. It is preferred that the structural frame bracket 108 is attached to the running board structural assembly 124 via the member connector 106 as shown in FIGS. 2, 5 and 7-8, thereby allowing the running board members (102, 104) to be constructed in a less bulky fashion. For example and as shown in FIGS. 3, 6 and 8, each of the running board members (102, 104) is constructed of a material forming an open channel 128 with curved edges 130 and wrapped around corners 132 providing a smooth appearance. It is preferred that the running board members are constructed out of art-disclosed suitable material(s) such as metal, metal alloy, plastic, composite, fiberglass, or the like.

It is preferred that the member connector 106 provides at least some structural support to the running board 100 as shown in FIGS. 3 and 6-8. Referring to FIGS. 9-12, another exemplary embodiment of the member connector 106 and structural frame bracket 108 are provided. In this embodiment, the member connector 106 is comprised of three structural members (137, 138, 139) that are attached to each other, the interior portions 122 of the running boards (102, 104), and the structural frame bracket 108 as shown in 10-12 with art-disclosed attachment means 134 (e.g., threaded bolts, nuts, washers, and the like). It is optional that one of the structural members (e.g., 137) includes a slot feature 140 to further strengthen the attachment with (e.g., locking itself in) the structural frame bracket 108.

Each of the step pads 110, 112, 114 includes art-disclosed attachment means 134 (e.g., threaded bolts or the like, nuts, washers, retaining clips, barrel clips, snaps molded into the bottom of the step pads, etc.) for attachment to one or more of the following components: the running boards (102, 104), the member connector 106, and the structural frame bracket 108 via their apertures 136.

Although there has been hereinabove described a modular running board system in accordance with the present invention, for purposes of illustrating the manner in which the invention may be used to advantage, it will be appreciated that the invention is not limited thereto. Accordingly, any and all modifications, variations, or equivalent arrangements which may occur to those skilled in the art should be considered to be within the scope of the present invention as defined in the appended claims.

What is claimed is:

1. A modular running board system for attachment to a vehicle comprising: a first running board member, a second running board member, a member connector, a structural frame bracket, and at least one seam covering step pad, wherein:
   a. each of the running board members is a separate structural component having an exterior end and an interior end portion;
   b. the interior end portion accepts and attaches to a portion of the member connector, which is also a separate structural component;
   c. when the member connector is attached to the interior end portion of the first running board member and the interior end portion of the second running board member, a running board structural assembly having a connection seam is formed having the member connector, the first running board member and the second running member;
   d. the connection seam is formed by placing the interior end portion of the first running board adjacent to the interior end portion of the second running board;
   e. the at least one seam covering step pad attaches to the running board structural assembly and hides the connection seam from exterior view forming a seamless finished appearance;
   f. the structural frame bracket includes (i) a connection portion for attachment to the running board structural assembly, and (ii) a structural frame portion for attachment to structural frame of the vehicle and
   g. the structural frame bracket's connection portion is attached to the running board structural assembly via the member connector.

2. The modular running board system of claim 1 wherein the exterior end of each of the running board members includes an end cap.

3. The modular running board system of claim 2 wherein two non-seam covering step pads are attached to the running board structural assembly.

4. The modular running board system of claim 1 wherein at least one non-seam covering step pad is also attached to the running board structural assembly.

5. The modular running board system of claim 1 wherein each of the running board members is constructed of a material forming an open channel with curved edges and wrapped around corners providing a smooth appearance.

6. The modular running board system of claim 1 wherein the first running board member, the second running board member, the member connectors, and the structural frame bracket all include apertures for attachment purposes.

7. The modular running board system of claim 6 wherein the at least one seam covering step pad includes attachment means for attachment to the apertures of a component selected from the group consisting of the first running board member, the second running board member, the member connector, the structural frame bracket, and a combination thereof.

8. A modular running board system for attachment to a vehicle comprising: a first running board member, a second running board member, a member connector, a structural frame bracket, and at least one seam covering step pad, wherein:
   a. each of the running board members is a separate structural component having an exterior end having an end cap and an interior end portion;
   b. the interior end portion accepts and attaches to a portion of the member connector, which is also a separate structural component;
   c. when the member connector is attached to the interior end portion of the first running board member and the interior end portion of the second running board member, a running board structural assembly having a connection seam is formed having the member connector, the first running board member and the second running member;
   d. the connection seam is formed by placing the interior end portion of the first running board adjacent to the interior end portion of the second running board;

e. the at least one seam covering step pad attaches to the running board structural assembly and hides the connection seam from exterior view forming a seamless finished appearance;

f. the structural frame bracket includes (i) a connection portion for attachment to the running board structural assembly, and (ii) a structural frame portion for attachment to structural frame of the vehicle;

g. the structural frame bracket's connection portion is attached to the running board structural assembly via the member connector.

9. The modular running board system of claim 8 wherein at least one non-seam covering step pad is also attached to the running board structural assembly.

10. The modular running board system of claim 9 wherein two non-seam covering step pads are attached to the running board structural assembly.

11. The modular running board system of claim 8 wherein each of the running board members is constructed of a material forming an open channel with curved edges and wrapped around corners providing a smooth appearance.

12. The modular running board system of claim 8 wherein the first running board member, the second running board member, the member connectors, and the structural frame bracket all include apertures for attachment purposes.

13. The modular running board system of claim 12 wherein each of the at least one seam covering step pad includes attachment means for attachment to the apertures of a component selected from the group consisting of the first running board member, the second running board member, the member connector, the structural frame bracket, and a combination thereof.

14. A modular running board system for attachment to a vehicle comprising: a first running board member, a second running board member, a structural frame bracket, and at least one seam covering step pad, wherein:

a. the first running board is a separate structural component having an exterior end and an interior end member connector portion;

b. the interior end member connector portion includes a first interior end portion and a member connector;

c. the second running board is a separate structural component having a second interior end portion and an exterior end portion;

d. the interior end member connector portion of the first running board accepts and attaches to the second interior end portion of the second running board via the member connector of the first running board forming a running board structural assembly having a connection seam, the member connector, the first running board member and the second running member;

e. the connection seam is formed by placing the first interior end of the first running board adjacent to the second interior end portion of the second running board;

f. the at least one seam covering step pad attaches to the running board structural assembly and hides the connection seam from exterior view forming a seamless finished appearance;

g. the structural frame bracket includes (i) a connection portion for attachment to the running board structural assembly, and (ii) a structural frame portion for attachment to structural frame of the vehicle;

h. the structural frame bracket's connection portion is attached to the running board structural assembly via the member connector of the first running board.

15. The modular running board system of claim 14 wherein at least one non-seam covering step pad is also attached to the running board structural assembly.

16. The modular running board system of claim 15 wherein two non-seam covering step pads are attached to the running board structural assembly.

17. The modular running board system of claim 14 wherein each of the running board members is constructed of a material forming an open channel with curved edges and wrapped around corners providing a smooth appearance.

18. The modular running board system of claim 14 wherein the first running board member, the second running board member, and the structural frame bracket all include apertures for attachment purposes.

19. The modular running board system of claim 18 wherein each of the at least one seam covering step pad includes attachment means for attachment to the apertures of a component selected from the group consisting of the first running board member, the second running board member, the structural frame bracket, and a combination thereof.

* * * * *